United States Patent

[11] 3,595,267

| [72] | Inventor | Howard L. Anderson<br>Wyandotte, Mich. |
|---|---|---|
| [21] | Appl. No. | 807,609 |
| [22] | Filed | Mar. 17, 1969 |
| [45] | Patented | July 27, 1971 |
| [73] | Assignee | Wyandotte Chemicals Corporation<br>Wyandotte, Mich. |

[54] LIQUID LEVEL CONTROL DEVICE
3 Claims, 4 Drawing Figs.

[52] U.S. Cl. .................................................. 137/558,
200/84 C, 340/244 A
[51] Int. Cl. ......................................................G08b 21/00
[50] Field of Search.......................................... 137/412,
432, 558; 73/308, 313; 340/244 A; 200/61.2, 84.3

[56] References Cited
UNITED STATES PATENTS

| 3,113,282 | 12/1963 | Coleman ...................... | 73/313 UX |
| 3,242,474 | 3/1966 | Gast et al. ..................... | 340/244 A |
| 3,266,312 | 8/1966 | Coleman et al. ............... | 73/313 |
| 3,408,053 | 10/1968 | Vantroba ..................... | 73/313 X |

Primary Examiner—Robert G. Nilson
Attorneys—Cedric H. Kuhn, Robert E. Dunn, Bernhard R. Swick, Charles G. Lamb and Joseph D. Michaels ABSTRACT: A liquid level control device, adapted for use with apparatus for dispensing fluid from a reservoir to a drum or tank, that includes a conduit and an electrical relay encased in a tubular housing and disposed in the reservoir. The conduit is operable to deliver a stored fluid from the reservoir to the drum of a dispensing machine or the like and the relay is responsive to the level of liquid in the reservoir and connected to means for indicating when the liquid falls below a desired level.

INVENTOR.
Howard L. Anderson
BY
ATTORNEY

INVENTOR.
Howard L. Anderson

LIQUID LEVEL CONTROL DEVICE

The present invention relates to dispensing machines provided with replenishment reservoirs and a main drum. More particularly, the invention relates to novel apparatus associated with such reservoirs which functions as a reservoir depletion indicator relay and as a fluid delivery means from the reservoir to the main drum.

The use of reservoirs and associated devices as a means for replenishing product concentrations in the main tanks or drums of dispensing machines and the like is well known in the art. These associated devices generally comprise a complex network of pumps, conduits, couplings, and the like which interconnect the reservoir to the main drum to provide fluid communication therebetween. This complex structure usually requires manual installation which not only adds to the cost of the machine, but also subjects the machine to the possibility of multiple malfunction. Inherently this is true with fluid connections which are always subject to a leakage malfunction.

Usually incorporated into this structure are other devices which include electrically actuated indicating devices for indicating depletion of the reservoir, sensing means to determine product concentrations in the main drum, and other devices which actuate a replenishment operation from the reservoir to the main drum. These "extra" devices are usually separate units manually installed within the dispensing machine and are distinctly and separately interconnected to the reservoir and the main drum of the machine. This again adds to the initial cost of the machine.

The present invention, which will subsequently be described in greater detail, simplifies this hereinbefore described structure. The present invention resides in a novel, inexpensive device, disposed in the reservoir which functions as a relay for indicator means for indicating reservoir depletion and as a means for delivering product from the reservoir to the main drum. This device eliminates both the fluid connections and electrical connections heretofore associated with the reservoirs of dispensing machines.

The device of the present invention generally comprises a support means having one end removably seated on a reservoir of a dispensing machine or the like and having a tubular housing or casing connected to its opposite end. The casing extends into and to a point near the bottom of the reservoir. A conduit has one end positioned in the casing and terminating substantially coplanar with the lower end of the casing. The opposite end of the conduit extends through the tubular housing and support means and is connected to the tank or drum of the machine. A normally open relay electrically connected to a visual display means is also encased within the tubular housing and is positioned adjacent the conduit at the lower end of the tubular housing.

As will subsequently be explained the conduit defines a suction tube which communicates with and delivers fluid to the main drum of the dispenser. The relay when actuated, completes an electrical circuit which thereupon renders visual indication of the depletion of the product from the reservoir.

For a more complete understanding of the present invention, reference is made to the following detailed description and accompanying drawing in which like reference numerals refer to like parts throughout the several views and in which.

DESCRIPTION OF THE PREFERRED EMBODIMENT

The present invention will be described with reference to a dishwasher wherein its reservoir contains a liquid detergent composition. However, it is to be understood that it is within the scope of the invention to utilize the present device in any dispensing machine environment providing replenishment of a main drum from a reservoir, such as beverage dispensing machines and the like.

Figures 1, 3:
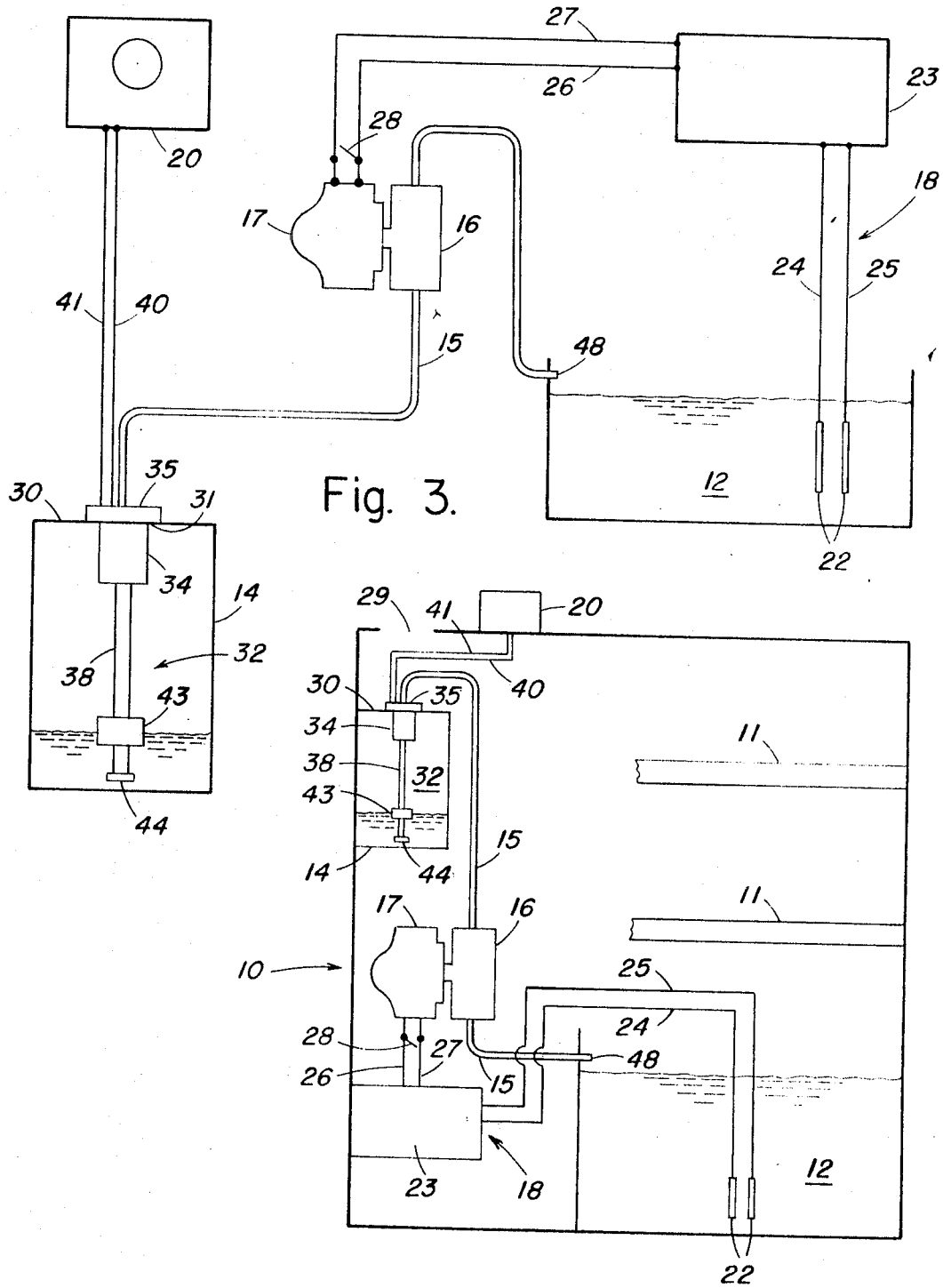
FIG. 1 is a sectional view of a dishwasher, with parts omitted, depicting the present invention.
FIG. 3 is a flow sheet illustrating a dishwashing cycle embodying the present invention.

With reference now to FIG. 1, it can be seen that the device of the present invention is shown in combination with a dishwasher 10 having dish retainers 11 and a main drum or wash tank 12. Wash tank 12 is connected to a detergent reservoir 14 by means of a conduit 15. A pump 16 is positioned in conduit 15 intermediate wash tank 12 and reservoir 14. Any suitable means, such as an electric motor 17, is adapted to drive pump 16. A sensing means, generally indicated at 18, is adapted to determine detergent concentrations in tank 12 and in response thereto to actuate motor 17, in a manner that will be subsequently described. The dishwasher also includes a warning device or indicator 20, such as, a visual display means, a bell or buzzer for indicating depletion of liquid in reservoir 14 to a predetermined level. For purposes of simplification and clarity, conventional mechanisms used in machine dishwashers, such as agitating, recycling, and water delivery means are not shown.

As was hereinbefore stated, the device of the present invention includes a sensing means 18 which is operable to actuate the motor 17 which is operatively connected to pump 16. Referring to FIGS. 1 and 3, it can be seen that sensing means 18 comprises a pair of electrodes 22 immersed in tank 12, and electrically connected to a conductivity meter 23 by conductors 24 and 25. A pair of conductors 26 and 27 electrically connect the conductivity meter to a switch 28.

As is known in the art, the conductivity meter 23 is adapted to respond to the electrical resistance generated between electrodes 22, that resistance being inversely proportional to the detergent concentrations in tank 12. Meter 23 is designed such that if the resistance between the electrodes is above a predetermined level, indicating low concentrations in the tank, a current will flow from meter 23 to switch 28. The current flow will close switch 28, thereby actuating motor 17 and energizing pump 16. The current flow to the switch will not cease until the resistance between the electrodes falls below that predetermined level. Thus, it can be seen that sensing means 18 cooperates with pump 16 to maintain predetermined detergent concentrations in tank 12. The power source for operating the meter 23 can be a transformer (not shown) electrically connected to the motor 17 or any other suitable means can function as the power source. For a more detailed discussion of a sensing means 18 reference is made to U.S. Pat. No. 3,319,637. It is to be noted, however, that sensing means 18 and the circuitry associated therewith in and of themselves form no part of the instant invention.

Referring still to FIGS. 1 and 3, it is seen that reservoir 14, which can be of any conventional configuration, is mounted to the interior of a sidewall of the dishwasher 10 by mounting brackets (not shown) or the like, and is disposed adjacent a portal or opening 29 provided in any convenient wall of the dishwasher to afford means for refilling the reservoir 14. In the embodiment shown, portal 29 is provided in the top wall of dishwasher 10 and reservoir 14 is mounted to a sidewall of the dishwasher 10 below the portal.

Preferably, the top of the reservoir is open to facilitate refilling of the liquid detergent or aqueous solutions of the powdered detergent normally contained therein. The reservoir also has a cover plate 30, having an aperture 31 therethrough, adapted to removably engage and close the open top of the reservoir 14. It is to be understood that other closure arrangements for the reservoir can be utilized without departing from the spirit or scope of the invention. For example, the top of the reservoir can be closed by a plate fixedly attached thereto and provided with an opening and lid.

A liquid level control device or apparatus, generally indicated at 32, and having its upper portion seated on plate 30 is insertable through aperture 31 and into reservoir 14 to a point above the base or bottom of the reservoir. It is liquid level control device 32 which makes possible the simplification of the heretofore complex structure associated with dispensing machines.

Figure 2:
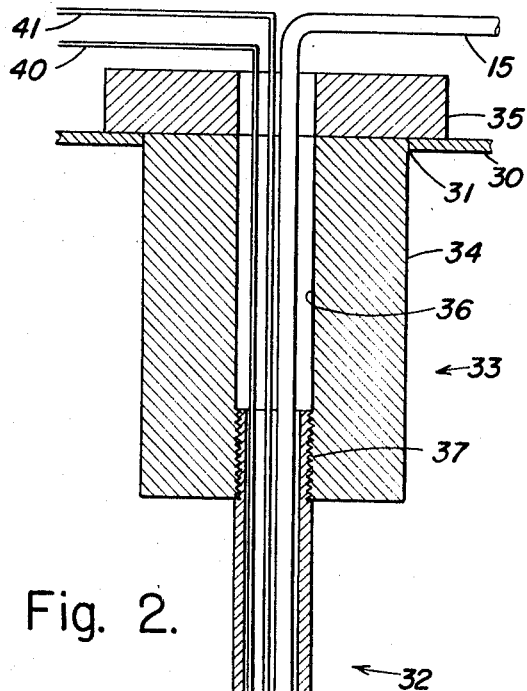
FIG. 2 is a cross-sectional view of the device of the present invention.

Referring in particular to FIG. 2, control device 32 includes a support means 33 comprising a housing 34 and a collar 35 integrally formed therewith or attached at one thereof. In use collar 35 abuts plate 30 of reservoir 14 in a manner such that control device 32 is removably seated thereon. Support means 33 has an opening or bore 36 formed in and extending through housing 34 and collar 35. The end of the housing opposite the collar is internally threaded as at 37. An elongated tubular housing or casing 38, externally threaded at both ends, has one end threadedly connected to housing 34 and extends downwardly therefrom to a point near the bottom of reservoir 14. The interior of casing 38 registers with bore 36 to obviate any pressure differentials within control device 32. As shown in FIG. 2, casing 38 can comprise a plurality of similar casings interconnected by connectors 38a or the like to accommodate various depths of reservoirs. Support means 33 and casing 38 can also be formed as a single unit, if so desired, to defined a substantially cylindrical or other appropriately shaped housing.

Still referring to FIG. 2, disposed within casing 38 is one end of conduit 15. The conduit connects tank 12 and reservoir 14 (FIGS. 1 and 3), extending through support means 33 and casing 38 and terminating substantially coplanar with the lower end of the casing. Conduit 15 defines or functions as a suction tube which delivers detergent from reservoir 14 to tank 12 by means of pump 16. Also contained within casing 38 is a relay 39 which is emplaced at the lowermost end thereof and adjacent conduit 15. Relay 39 comprises a reed switch of any well known construction and has the principle characteristic of emitting electrical impulses upon being closed. Closing occurs when the switch is subjected to a magnetic influence. These switches are commercially available such as those manufactured by Hamlin, Inc. A pair of conductors 40 and 41 extends from switch 39 through casing 38 and support means 33 and terminates at indicator 20. Thus, indicator 20 is adapted to be in electrical circuit with switch 39 and responsive to a flow of current therefrom in a manner well known in the art.

The conduit, switch, and conductors are kept securely in position within device 32 by provision of a potting composition 42, preferably a composition of tetrafluoroethylene which is available commercially under the trademark Teflon. The potting composition, while maintaining the relative positions of the components, also functions as an insulating means between conduit 15, casing 38, and switch 39.

A float member 43 is slidably mounted on casing 38 and is movable between the lower or threaded end of housing 34 and the upper surface of a stop 44. Stop 44, in the form of a nut, washer, or the like, is fixedly or adjustably attached to casing 38 at its free or lowermost end. As will subsequently be explained, the stop 44 cooperates with float 43 to define the point when the indicator 20 will be actuated to indicate depletion of liquid in reservoir 14. Float 43 is of any suitable form such as a ring or the like and is comprised of any suitable material, such as wood or a plastic material which exhibits a buoyancy in a liquid environment. Float 43 is provided with a plurality of bores or openings located around its periphery in which a plurality of magnets 46 are positioned. As will hereinafter be explained, these magnets cooperate with switch 39 to actuate an electromagnetic circuit that indicates depletion of the content of the reservoir.

Figure 4:
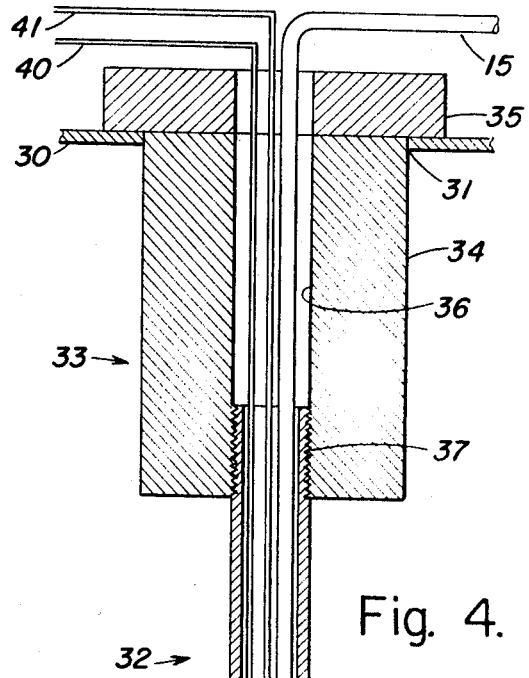
FIG. 4 is a view similar to FIG. 2, but depicting another embodiment of the present invention.

With reference now to FIG. 4, there is depicted another preferred embodiment of the present invention. For purposes of brevity, reference numerals in FIG. 4 similar to those in FIGS. 1—3 refer to similar parts. In accordance with this embodiment, the relay is thermal, rather than electromagnetically, responsive. Thermal responsivity is afforded by replacement of the magnetic reed switch with a thermistor, which may be of any well-known construction.

In this embodiment, a thermistor 47 is embedded within potting composition 42 and disposed within casing 38 such that it lies adjacent the lower terminal point of conduit 15. Thermistor 47 provides a normally open relay which is closed when subjected to atmospheric or ambient temperatures. In other words, when the control device 32 of the present invention is immersed in a aqueous solution in the reservoir 14, that is at a temperature above ambient temperature, thermistor 47 remains open. However, when reservoir 14 is depleted of solution, thermistor 47 closes in response to being subjected to ambient temperature. When closed, the thermistor emits electrical impulses through the conductors 40 and 41 to indicator 20 in a manner similar to that of the first embodiment.

By replacing the magnetic switch of the first embodiment with the thermistor, the need for a float member is eliminated, thereby providing a more simple and less expensive construction.

OPERATION OF THE SYSTEM

In utilizing the liquid control device of the present invention, reservoir 14 is initially filled with a detergent supply. The device is then inserted into reservoir 14 with collar 35 of support means 33 seatingly engaging plate 30.

As shown schematically in FIG. 3, during the operation of the machine, conductivity meter 23 senses the electrical resistance generated between the electrodes 22. Meter 23 is calibrated such that the level of the resistance will be in inverse proportion to the detergent concentration in tank 12. If the resistance is above a predetermined level, then meter 23 causes current to flow to switch 28 which then closes to actuate motor 17. Actuation of motor 17 energizes pump 16.

When actuated, pump 16, which may be of any well-known construction, draws fluid from reservoir 14 through conduit 15 to tank 12. The fluid is delivered to tank 12 through detergent inlet 48 thereby replenishing the detergent in the tank.

When the concentration of detergent in tank 12 is increased, the resistance generated between the electrodes immersed in the tank will be below the predetermined level, thereby halting the current flow from meter 23 to switch 28. The switch is, as a result, opened so that motor 17 and pump 16 cease to operate.

Concurrent with the pumping of the detergent from reservoir 14, the liquid level therein is lowered, thereby causing float 43 to lower accordingly. When the detergent in the reservoir 14 is substantially exhausted, float 43 is in a position abutting the upper surface of the stop 44. Magnets 46 in the float then energize and close the switch 39. Electromagnetic impulses are thereupon generated by switch 37 and transmitted through the conductors 40 and 41 to indicator 20, which reacts accordingly, to indicate depletion of liquid in reservoir 14.

Reservoir 14 can then be refilled by unseating control device 32 from the plate 30 and removing it from the reservoir 14. Detergent is then added through aperture 31 in plate 30 or by removing plate 30 and adding detergent directly to the reservoir.

When the second embodiment of the present invention is utilized, the operation is essentially the same as just described. The only difference in operation occurs with depletion of liquid in the reservoir. Rather than magnetic impulses energizing the relay, mere subjection of thermistor 47 to ambient temperature energizes the relay and this occurs when the reservoir is substantially depleted of liquid. When this happens, electrical impulses are emitted to the indicator with the same results as hereinbefore described.

It is thus apparent that a unique and novel device has been described which in combination with a sensing means and a pumping means affords a simplified, reliable system for replenishing liquid concentrations in main drums of dispensing machine, dishwashers and the like. The present apparatus also provides reliable means for indicating the liquid level in a reservoir.

The foregoing specification describes and illustrates several embodiments of the invention with some degree of particularity. Variations and modifications thereof will occur to those skilled in the art that are within the spirit and scope of the invention.

I claim:

1. In combination with a fluid reservoir having a cover plate and an aperture therethrough, a liquid level control device comprising:
   a. a casing disposed in the reservoir and extending downwardly from the cover plate to a point proximate the bottom of the reservoir;
   b. support means provided on the casing which engages the cover plate to support the casing through the aperture;
   c. a conduit for delivering fluid from the reservoir having one end terminating in proximity to the lower end of the casing and extending upwardly therefrom through the casing and the support means;
   d. a normally open reed switch emplaced within the casing at the lowermost end thereof and adjacent the end of the conduit;
   e. a pair of conductors connected to the switch and extending therefrom to a suitable indicating device which indicates depletion of the reservoir in response to the closing of the switch; and
   f. a float member provided with a plurality of magnets positioned therein slidably mounted on the casing and movable between an upper first position and a lower second position and wherein the magnets are operable to close the switch when the float member is in the second position.

2. The device of claim 1 which further includes a stop connected to the casing at the lowermost end thereof, the stop defining the second position.

3. The device of claim 1 and further including insulating means disposed within the casing and maintaining the relative positions of the switch and the conduit.